United States Patent [19]

Worsham

[11] 4,401,002
[45] Aug. 30, 1983

[54] SOFFIT CUTTING MECHANISM

[76] Inventor: Victor H. Worsham, P.O. Box 1318, Crystal River, Fla. 32629

[21] Appl. No.: 346,420

[22] Filed: Feb. 8, 1982

Related U.S. Application Data

[63] Continuation of Ser. No. 91,588, Nov. 5, 1979, abandoned.

[51] Int. Cl.³ ............................................. B23D 17/08
[52] U.S. Cl. .................................. 83/467 R; 83/589; 83/609; 83/694
[58] Field of Search .................. 83/467, 589, 601–609, 83/694

[56] References Cited

U.S. PATENT DOCUMENTS

| | | | |
|---|---|---|---|
| 237,402 | 2/1881 | Luther | 83/609 X |
| 1,044,966 | 11/1912 | Adams et al. | 83/607 |
| 1,112,076 | 9/1914 | McGorvin | 83/607 |
| 1,391,827 | 9/1921 | Goetze | 83/609 |
| 2,005,355 | 6/1935 | Tierney, Jr. | 83/589 X |
| 2,582,933 | 1/1952 | Nielson | 83/607 |
| 3,393,595 | 7/1963 | Halverson et al. | 83/609 X |
| 3,866,522 | 2/1975 | Oswalt, Jr. | 83/608 X |

Primary Examiner—James M. Meister
Attorney, Agent, or Firm—William M. Hobby, III

[57] ABSTRACT

An apparatus for cutting soffits, or the like, has a base and a hinged blade swingably attached to the base. A fixed profile blade attached to the base co-acts with the hinged blade for shearing lengths of soffit material. A blade guide is operatively connected between the base and the hinged blade for supporting the hinged blade during cutting. The profile blade is shaped to receive the profile of the soffit material for supporting the material during the cutting.

3 Claims, 5 Drawing Figures

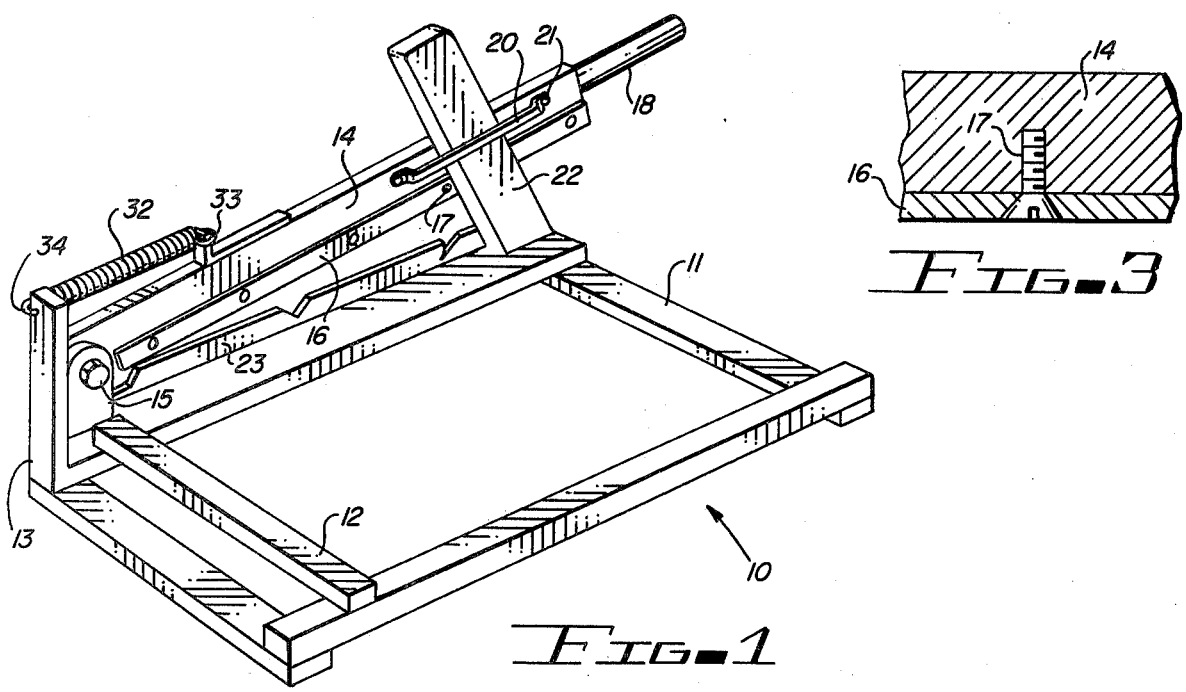
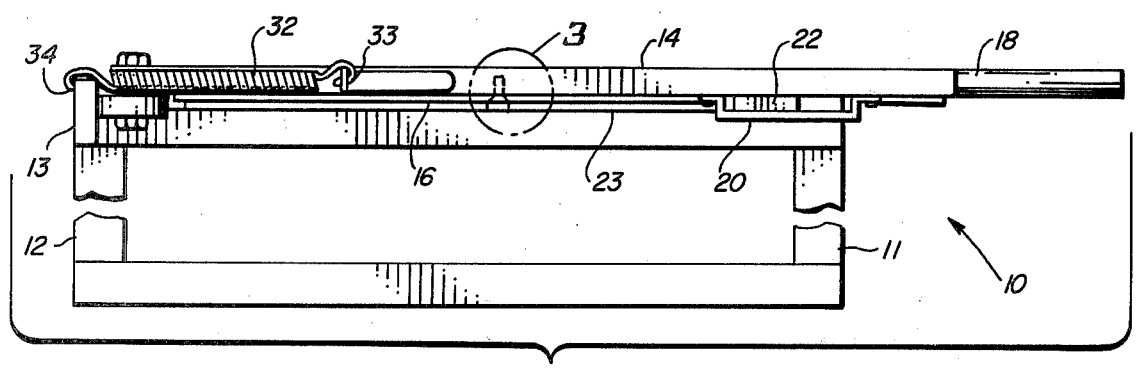
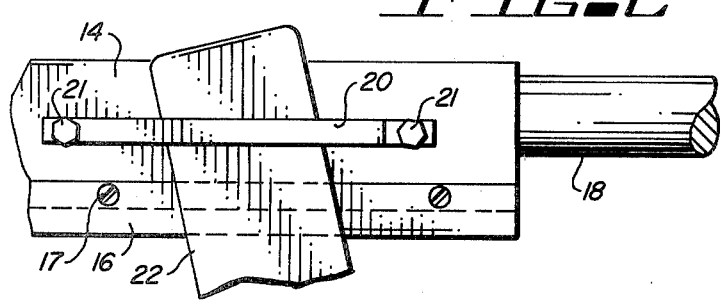
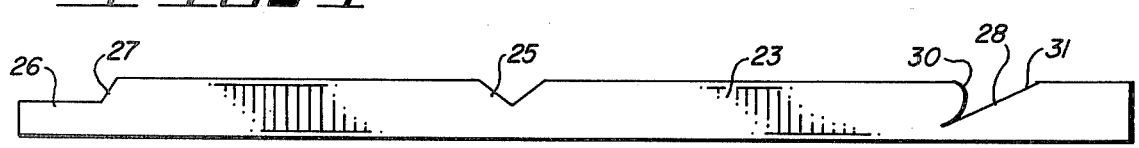

ID_CUTTING MECHANISM

This application is a continuation, of application Ser. No. 91,588, filed 11/05/79, now abandoned.

BACKGROUND OF THE INVENTION

The present invention relates to cutting mechanisms, and especially to a cutting mechanism for rapidly and accurately cutting metal soffit material, or the like.

In the past, soffits were commonly made from lumber, or were cut from sheets of plywood. Presently, soffit material is available in thin metal sheets, such as aluminum sheets, formed in lengths that must be cut off when fitting onto a house. The cutting is done at on-site locations. Typically, the soffit material has a predetermined shaft, which might have a V-shaped ridge running along the middle portion thereof and shaped at either end to allow the soffit material to fit onto the house. The soffit material may be prefinished, such as primed and painted on one side. The material must be cut neatly in order to give an attractive appearance to the home. Cutting of the material is done by marking and sawing the material, or may be cut with tin snips, which, however, tend to give a rough edge to the material, especially when cutting through the shaped portions of soffit material. Thus, present techniques for cutting the material are either slow or give an uneven finish.

The present invention is directed toward a soffit cutter for cutting aluminum preformed soffits rapidly and cleanly without requiring additional filing or straightening of cut surfaces.

There have been a variety of prior art sheet metal shearing devices working on different principles, some of which include specially shaped blades or supports. Typical of such shearing devices is the Jasinski U.S. Pat. No. 3,771,401, having a fluid actuated cutting blade for cutting sheet metal, and the Rayner U.S. Pat. No. 2,219,602, of Oct. 29, 1940, for a shearing tool having cutting blades for cutting corrugated sheet material such as corrugated iron and having a corrugated support for the material during cutting. In the Bailey U.S. Pat. No. 2,692,647, a shingle cutter uses a shearing action for cutting shingles along the edge of a building roof, while the Teplitz U.S. Pat. No. 3,279,295 has a hydraulically actuated siding shear having a shaped blade. Other patents for shearing devices may be seen in the Bustin U.S. Pat. No. 3,803,894, and in the Tucker U.S. Pat. No. 2,588,999 for a reed hat leather trimming machine. In U.S. Pat. No. 3,134,285 to Green, a siding cutter is provided using a shearing action mounted to an adjustable frame for cutting preshaped siding material, and which has a hinged blade which co-acts with two die blades to facilitate cutting the siding at various angles.

SUMMARY OF THE INVENTION

A soffit cutting mechanism for cutting soffits at on-site locations has a base or frame having a hinged cutting blade swingably attached thereto. A profile blade is attached to the base and positioned to support soffit material and for co-acting with the hinged blade to cut off a length of the soffit material. The profile blade has a predetermined profile shape for supporting the profile or cross section of the soffit material. A blade guide has a guide member attached to the frame and a guide bracket attached to the hinged blade riding on the guide member for supporting the hinged blade during cutting. A squaring guide allows the aligning and feeding of the material onto the profile blade.

BRIEF DESCRIPTION OF THE DRAWINGS

Other objects, features and advantages of the present invention will be apparent from a study of the written description and the drawings, in which:

FIG. 1 is a perspective view of a soffit cutter in accordance with the present invention;

FIG. 2 is a top elevation of the cutting mechanism of FIG. 1;

FIG. 3 is an enlarged sectional view taken on the circle 3 of FIG. 2;

FIG. 4 is a fragmentary elevation of the guide mechanism of the soffit cutter of FIGS. 1 and 2; and FIG. 5 is a side elevation of the profile blade for the soffit cutter of FIGS. 1 through 4.

DESCRIPTION OF THE PREFERRED EMBODIMENT

Referring to the drawings, a soffit cutting mechanism 10 is illustrated in FIGS. 1 and 2 having a base 11 with a squaring guide 12 mounted thereon. The base has a cutting blade hinge support 13 having a blade bar 14 hinged thereto with a bolt 15. The cutting bar 14 has a cutting blade 16 mounted thereto with screws 17 and provides a straight cutting edge. Cutting bar 14 also has a handle 18 on one end and a guide bracket 20 supported with threaded fasteners 21 to the bar 14. The base has a guide track member 22 fixedly attached thereto and extending in a generally perpendicular manner to the guide bar 14 and adjacent the guide bar 14 and through the guide bracket 20 to support the guide bar along its edge. The base 11 of the soffit cutter also has a profile blade 23 attached to the base 11 with screws. This profile blade has a V-notch 25 in the middle portion thereof, a removed end portion 26 having an angled surface 27 on one end and a slot 28 on the other end portion with a curved portion 30 intersecting an angled surface 31. This profile blade is shaped to receive elongated soffit material to support the soffit material and to co-act with the blades 16 attached to the hinged cutting bar 14 to shear the soffit material supported by the base 11 and the profile blade 23. The hinged cutting blade bar 14 has a coiled spring 32 connected to a spring bracket 33 with the other end of the coiled spring connected into an aperture 34 in the hinged bracket 13.

In operation, a piece of soffit material is slid into the cutter along the aligning square guide 12 and positioned in the profile blade 23 with the appropriate protruding portions extending into the slotted areas 25, 26 and 28. The blade 16 can then be used to cut a smooth cut with one cut while the soffit material is supported all across its surface, thereby giving a cleaner cut and preventing bending or warping in protruding areas in the soffit supported by the slotted areas. In addition, the guides 20 and 22 support the opposite end of the cutter to force a smooth cutting action without binding or shifting of the cutting blade during a cutting operation. The soffit cutter mechanism is, advantageously, sufficiently small and portable to be taken to the job site to speed up the replacing of soffits on houses. In addition, the profile guide 23 is removably attached to the base 11 so that it can be replaced to handle a different shaped soffit material.

Accordingly, the present invention is not to be construed as limited to the particular forms shown herein, which are to be considered illustrative rather than restrictive.

I claim:

1. A soffit cutting mechanism comprising in combination:

a base;

a hinged cutting bar swingably attached to said base;

a blade attached to said hinged cutting bar to swing therewith;

blade guide means having a guide track attached to said base for supporting said hinged cutting bar and blade while cutting with said blade and a guide bracket attached to said hinged cutting bar and supporting said hinged cutting bar and attached blade to said guide track, said blade guide means guide bracket being attached to one side of said hinged cutting bar to fit over said guide track to hold said hinged cutting bar and blade guide track adjacent said guide track hinged cutting bar and blade;

a fixed profile blade attached to said base and positioned to support shaped material thereon and coacting with said hinged blade to cut off a length of said shaped material, said profile blade having a predetermined profile shape to receive and support said predetermined shaped material during cutting, said profile blade being a generally straight blade member having a generally V-shaped notch in the middle portion thereof and a removed portion on either end portion of said straight blade member adapted to receive aluminum soffit material supported across its profile on one side by said profile blade;

aligning means for aligning shaped material on said base in said profile blade said aligning means including a square guide mounted perpendicular to said hinged blade and to said profile blade, whereby swinging said hinged blade across said profile blade will shear an elongated shaped material positioned thereon;

a hinged blade support bracket attached to said base for holding said hinged blade cutting bar; and a spring connected between said hinged blade support bracket and said hinged blade hinge cutting bar to bias said blade to an open position.

2. A soffit cutting mechanism in accordance with claim 1, in which said blade guide means guide track extends in a generally perpendicular direction from said base and is fixedly attached to said base.

3. A soffit cutting mechanism in accordance with claim 1, in which said hinged blade has a handle on one end thereof.

* * * * *